Jan. 9, 1968 R. J. HALLE 3,362,736
CONNECTION OF STRUCTURAL ELEMENTS IN ROOFS
Filed Sept. 29, 1964 3 Sheets-Sheet 3

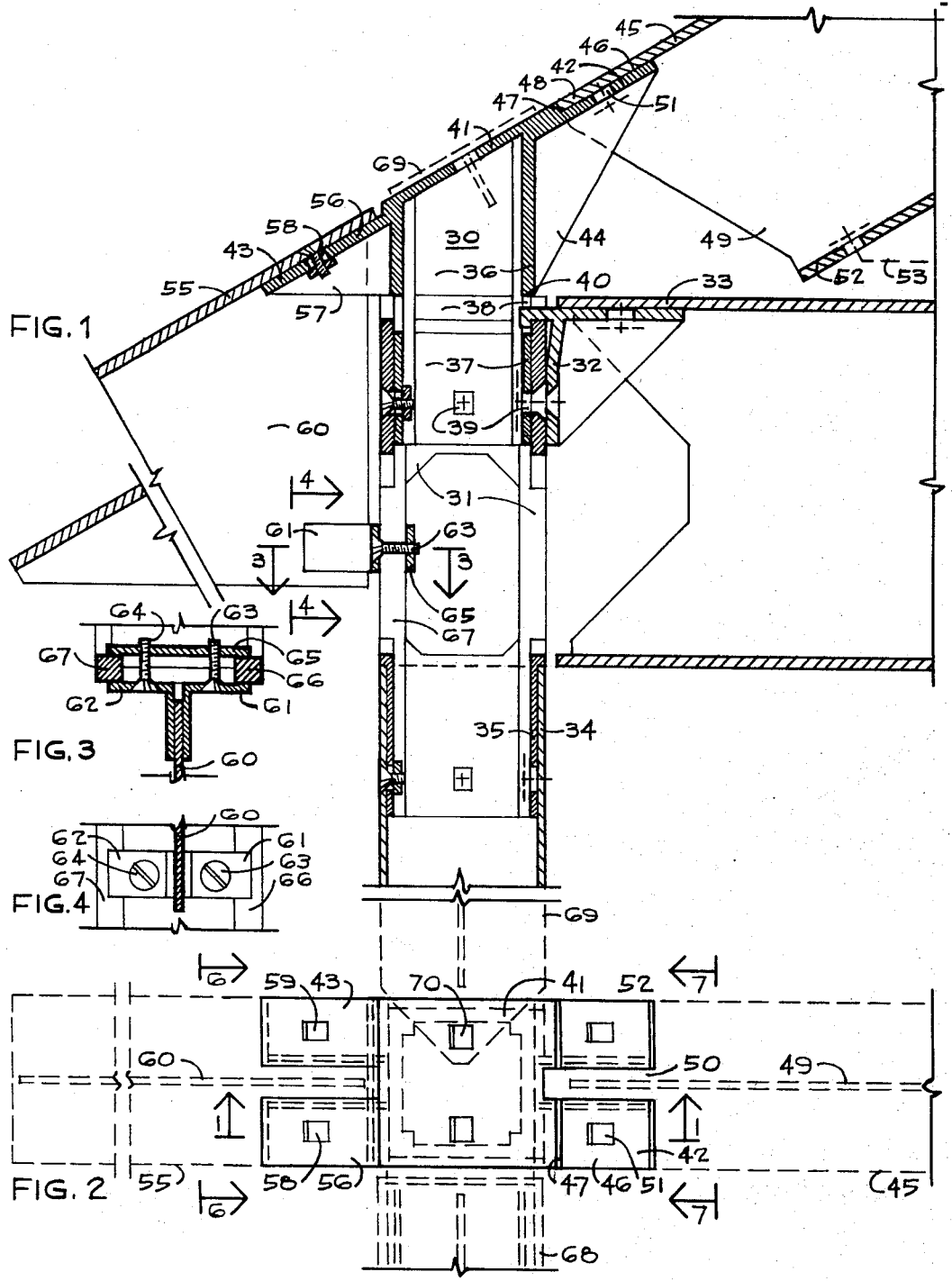

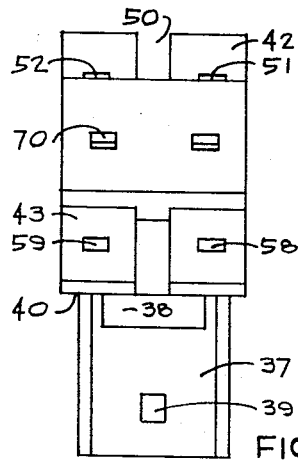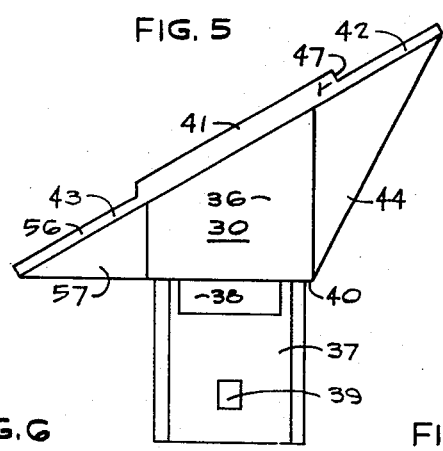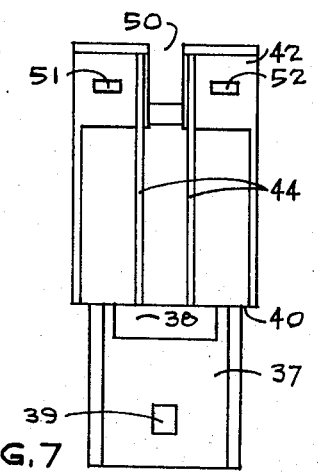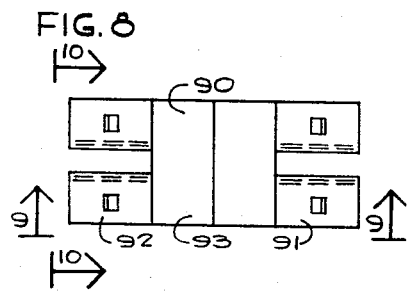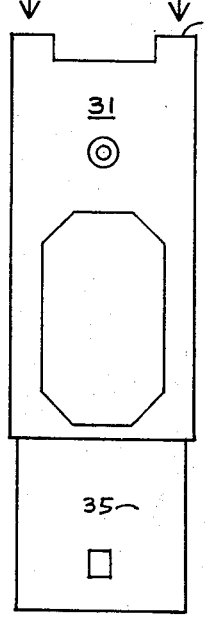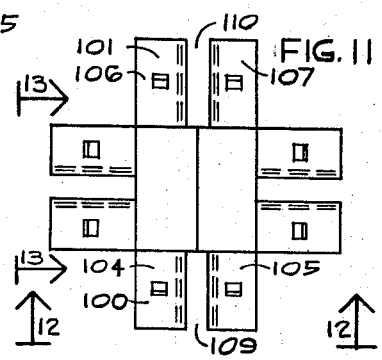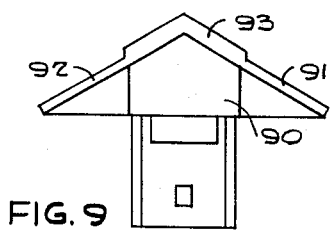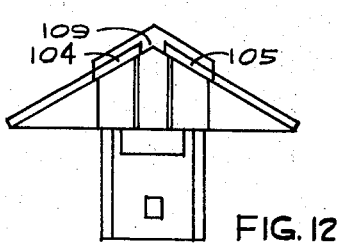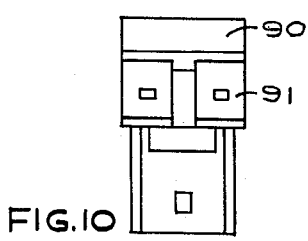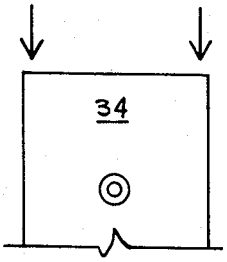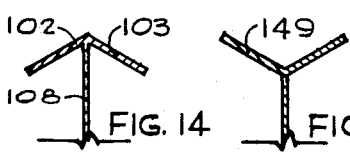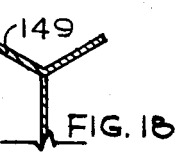

ROGER J. HALLE, INVENTOR

BY Robert S. Dunham ATTORNEY

3,362,736
CONNECTION OF STRUCTURAL ELEMENTS IN ROOFS
Roger J. Halle, Pound Ridge, N.Y. 10576
Filed Sept. 29, 1964, Ser. No. 400,101
1 Claim. (Cl. 287—189.36)

This invention relates to means for connecting and supporting frame or structural elements in the art of building and to assemblies of structural elements with such means. More specifically, it is related to frameworks for roofs, particularly pitched roofs. It is a further development related to my United States Patent No. 3,097,730, granted July 16, 1963.

A major aim of the invention is to achieve economy and flexibility in building through standardization and minimization of parts. Another object is to make possible the quick and ready organization of frame elements into complete roofs.

Provision is made for the elements to receive enclosure parts, such as roof panels, and to accommodate the practical requirements for carrying load and achieving needed tolerances.

In essence, the invention consists of a roof-supporting device which is supported on a frame element below, as by interfitting with the upper end of columnar structure, and particularly by interfitting with the so-called nucleus connector of the invention described in my aforementioned patent. More specifically, the connecting device of the present invention comprises a lower sleeve portion that interfits with the nucleus device below (which itself seats on a column, for connecting one or more horizontal beams), and an upper hat-shaped portion which has a configuration corresponding with the roof and includes one or more projecting brackets having suitably sloping upper surfaces, capable of receiving roof rafters, beams, girders, outriggers and the like. For brevity, the device of the invention, for connecting and supporting such roof elements, is sometimes identified herein as a "hat" or hat device.

The structure is conceived as being of steel, aluminum or other metals, although other materials, such as reinforced, laminated or other plastics, may be used.

By way of specific example, certain embodiments of the invention are illustrated in the accompanying drawings, in which:

FIG. 1 is a vertical section taken through the hat device, the associated nucleus connector below, and related frame elements, this section being generally along line 1—1 of FIG. 2, except that for completeness of view, the regions of fastening holes in the nucleus connector walls (e.g. as at 39) are shown as if in central vertical section.

FIG. 2 is a plan view of the hat, showing its relation to the connector and column below and to rafter, beam, strut and outrigger elements attached to the hat, all of these other parts being depicted in phantom (dashed-line) view.

FIG. 3 is a horizontal section, on line 3—3 of FIG. 1, through a clamp attaching the outrigger to the nucleus connector.

FIG. 4 is a sectional view, on line 4—4 of FIG. 1, through the web of the outrigger, and showing the clamp of FIG. 3 in elevation.

FIG. 5 is an exploded view of a hat device, nucleus connecting device and column, showing the direction and mode of assembly. The hat is shown in a side elevational view, with a bracket on the right for receiving a rafter, and on the left for receiving another rafter or an outrigger.

FIG. 6 is an elevational view of the hat in FIG. 5, along lines 6—6 of FIG. 2.

Similarly, FIG. 7 is an elevational view of the hat in FIG. 5, along lines 7—7 of FIG. 2.

FIGS. 8, 9 and 10 show a variant hat device as might be used at a ridge condition of a pitched roof structure. FIG. 8 is a plan view. FIG. 9 is a side elevational view along lines 9—9 of FIG. 8, and FIG. 10 similarly shows a side elevational view along lines 10—10 of FIG. 8.

FIGS. 11, 12 and 13 show another variant of a ridge unit, in which, in addition to brackets at either side for receiving rafters, there are additional brackets perpendicular in plan to the first two, for the purpose of receiving ridge girders. FIG. 11 shows a plan view of this element. FIG. 12 shows a side elevational view along lines 12—12 of FIG. 11, and FIG. 13 a side elevational view along lines 13—13 of FIG. 11.

FIG. 14 is a vertical cross-section showing the upper flange of a ridge girder, which would be used in connection with the hat of FIGS. 11, 12 and 13.

Figure 15:
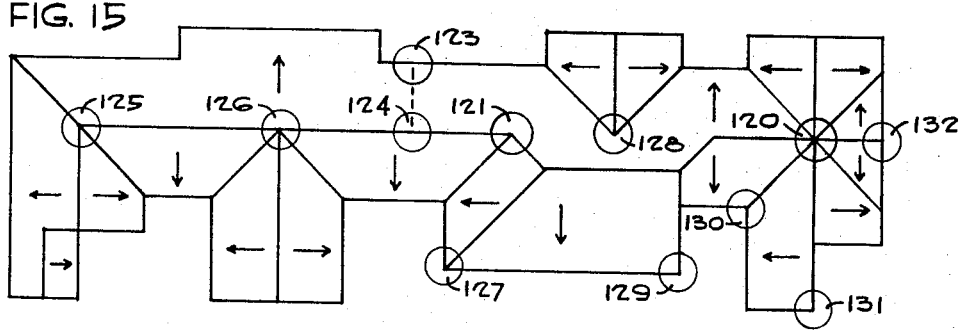

FIG. 15 is a hypothetical roof, in plan, designed to illustrate some of the joints that occur in pitched roofs.

Figure 16:
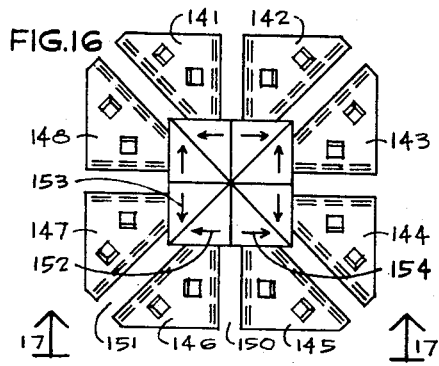
Figure 17:
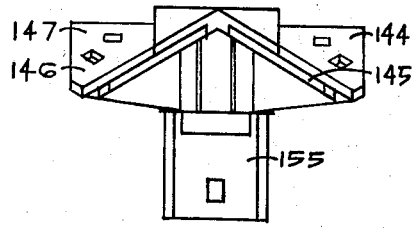

FIGS. 16 and 17 show a connecting device according to the invention, designed to serve one of the most complex joints in pitched roofs, where two gables intersect, as indicated at 120 of FIG. 15. FIG. 16 is a plan view. FIG. 17 is a side elevational view along lines 17—17 of FIG. 16.

FIG. 18 is a section similar to the section shown in FIG. 14, through a valley girder.

Figure 19:
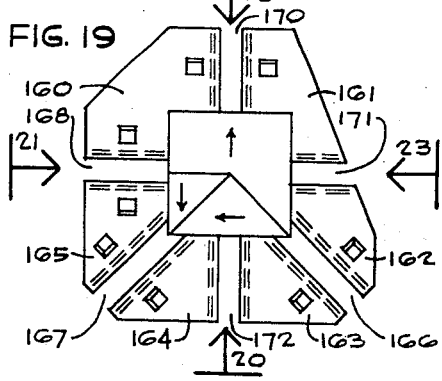
Figure 20:
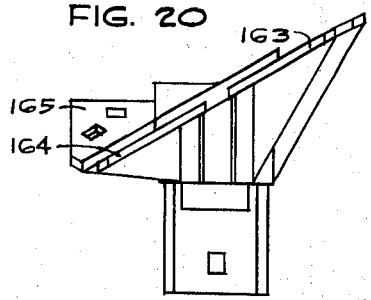
Figure 21:
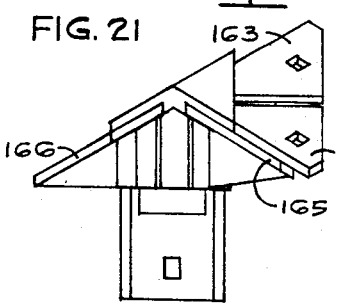
Figure 22:
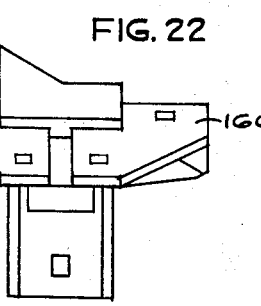
Figure 23:
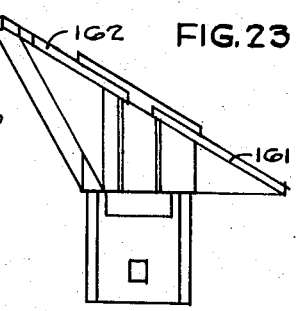

FIGS. 19 through 23 illustrate a hat device such as would be used at another of the most complex roof joints, as indicated at 121 of FIG. 15. FIG. 19 is a plan view. FIGS. 20, 21, 22 and 23 each show a side elevational view of this hat, in accordance with the correspondingly numbered lines in FIG. 19.

With reference to FIGS. 1 through 7 of the drawings, there is shown a roof-supporting device or hat 30, pursuant to the invention, seated in a nucleus connector 31, that may, for instance, be identical with such device as identified by the number 10 in my aforementioned patent, the disclosure of said patent being therefore deemed to be incorporated herein by reference. Also attached to the nucleus connecting device 31, in further accordance with the patent, is a hanger 32 and a beam 33 resting on the latter, it being understood that the nucleus connector device 31 has an upright body portion having the same cross-section as the column 34 below, upon which it seats and to which it is secured by an interfitting sleeve 35 as shown.

The connecting or hat device 30 comprises a body portion 36 which may if desired have a square cross-section (of external enveloping boundary) similar to the columnar structure below (e.g. the connector 31 and the column 34), and a lower sleeve portion 37, of smaller cross-section, having an external contour conforming with the internal contour of the connector 31, so that the sleeve may removably interfit with the latter. The sleeve 37 has horizontal openings 38 at the top of each of its four sides corresponding to the hanger-receiving openings at the top of the connector 31, e.g. to accommodate parts of hangers carried by the latter, such as hanger 32. The sleeve 37 also has bolt-receiving openings 39 to register with such openings in the connector 31, conveniently of larger size than the received bolt or similar fastening means, so that load will not be carried by the bolt; thus the sleeve may be secured to the columnar structure, i.e. (in this instance) to the connector 31 by fastenings, e.g. bolts, which may also serve to secure the hangers. The hat device has an inward offset at 40, between its body 36 and the sleeve 37, which provides a horizontal edge surface that rests in bearing relation on the upper horizontal edge surface of the connector 31 below, so that all load is carried here in bearing, rather than by the sleeve fastenings, this supporting arrangement and that of the sleeve being in agreement with the principles of corresponding parts in the connector device of the aforementioned patent.

The upper portion of the roof-frame-connecting device 30, comprises, at the top of the body 36, a central section 41 and one or more projecting brackets, frequently at least two such brackets 42 and 43. Bracket 42 extends in an upward direction, i.e. has a roof-conforming upward slope, and is braced by one or more webs 44 to the body 36. A beam-type roof frame member 45, or rafter, seats into bracket 42 so that its vertical component is essentially carried in bearing at the upper, sloping surface 46 of the bracket and its horizontal component at an edge 47, which is placed to be abutted by the end edge of the upper flange 48 of the rafter 45. Although the supporting edge 47 can, if needed or desired, be provided by one or more lugs or other suitable abutment structure projecting upward from or otherwise embodied in the bracket 42 or adjacent parts of the hat device, such abutment 47 is conveniently constituted, in the illustrated structure, as an edge of a raised or platform-like shape which essentially characterizes part or (as here) all of the central section 41 of the top of the device, and which is elevated above the adjacent regions of the bracket surfaces by approximately the flange thickness of the received frame elements.

The web 49 of the rafter 45 (here indicated as an I-beam) extends through a notch or opening 50 in the bracket, and the rafter is secured by bolts or like means which extend through holes in the rafter flange and cooperating openings 51 and 52, sufficiently large to afford needed tolerance in the bracket 42, as shown.

The downward extending bracket 43, which has a roof-conforming downward slope, can either receive another rafter or, as shown, an outrigger 55 or such an additional member can be omitted entirely. The outrigger 55, which may be used to support an overhanging part of the roof, and which is here shown as of T-section, has its downwardly sloping flange portion seated on the sloping plate portion 56 of the bracket 43, so that the vertical load of the outrigger is carried by the plate 56, the latter being braced or reinforced by one or more webs 57 extending to the body 36. Like the rafter, the outrigger is secured by bolts or like means through suitable openings 58 and 59 in the bracket plate 56. The outrigger has a web 60 (accommodated by a suitable notch or slot in the bracket, as shown) to which is attached, for example by welding, angles 61 and 62 which, by means of bolts 63 and 64 and plate 65, form a clamp around posts 66 and 67 of the nucleus connector 31 to prevent uplift of the outrigger under certain wind conditions.

Another beam, similar to beam 33, is shown at 68 (FIG. 2) as carried by the nucleus connector 31, for further illustration of building frame assembly below the roof frame parts. As may be desired, a strut 69 is shown which has a flange seated on part of the center section 41 and there attaches as at 70, to assist in receiving and securing roof panels. The lower flange 52 of the rafter can, as desired, be stabilized by means of a tie rod, indicated in dash line at 53 (FIG. 1) and extending to an opposite rafter or other part of the roof frame (not shown).

In FIG. 5, the hat unit 30 is shown in exploded view above the nucleus connector 31, and the latter similarly above the column 34, with the direction of assembly indicated by arrows. Upon such assembly, the downward facing bearing surface 40 rests against the upward facing plane 75 (i.e. the top edge) of the connector 31, as explained above, with the lower sleeve section 37 of the unit 30 interfitting into the connector 31. Similarly, the lower sleeve portion 35 of the connector 31 fits into the column 34, in accordance with my previous invention.

FIGS. 6 and 7 show elevational views of the roof-frame-connecting or hat device 30, with upward projecting bracket 42 and downward projecting bracket 43, bracing webs as at 44 and attachment openings as at 51, 52, 58, 59 and 70. The lower sleeve portion includes the openings such as at 38 and 39.

FIGS. 8, 9 and 10 show another embodiment 90 of the connecting device of the invention, which is identical with the previously described device 30, with the exception that both brackets 91 and 92 project downward, i.e. have downward roof-conforming slopes, so that unit is useable at a ridge condition. As shown, the center section 93 may then be of inverted V-shaped, having portions sloping respectively like the brackets.

Similarly, the further embodiment of the hat unit shown in FIGS. 11 through 13 is identical with that of FIGS. 8 through 10, with the exception of the addition of brackets 100 and 101 at the other two sides of the body to receive ridge girders such as shown in FIG. 14, in which the flanges 102 and 103 project downward to conform with the line of the roof. The bracket 100 consists of two sub-brackets 104 and 105, which have upper surfaces sloping in opposite directions from a ridge line that crosses the bracket, and the bracket 101 consists of two similar sub-brackets 106 and 107, so that the web 108 of the ridge girder can be accommodated in the spaces 109 and 110 respectively.

FIG. 15 shows a hypothetical roof in which representative simple and complex roof joints are shown. Here and in other plan views, sloping surfaces are indicated in a conventional manner by arrows which point in the downward direction of incline. A meeting of two intersecting gables as appropriate for use of the device in FIGS. 16 and 17, is indicated at 120. Another complex condition of intersecting slopes, such as can be accommodated by the connecting or hat device in FIGS. 19 through 23, is indicated at 121. A simple section such as for the device shown in FIGS. 1 through 7 is indicated at 123, and a ridge section suitable for a unit shown either in FIGS. 8 through 10 or 11 through 13, is shown at 124. Some of the other possible roof combinations or situations of slopes, appropriate for correspondingly modified roof frame connecting devices, are indicated at localities numbered from 125 through 132 inclusive.

In the device for the intersecting gable condition shown in FIGS. 16 and 17, projecting brackets numbered from 141 through 148 inclusive, each having the characteristic slope of one part of one gable, are designed to accommodate ridge and valley girders, e.g. the ridge girder of FIG. 14 or a valley girder 149 of FIG. 18. For example, the space 150 between brackets 145 and 146 accommodates, as in the aforementioned examples, the web of a ridge girder seated on those brackets, and the space 151 accommodates a valley girder seated on brackets 146 and 147. The bracket 146, for example, slopes in the direction from 150 downward toward 151, as indicated by the arrow 152, with the adjacent slopes as indicated by arrows 153 and 154. The unit is seated, as in the above-described other embodiments of the device, by means of a sleeve section 155, which interfits with a nucleus connector or other columnar structure.

FIGS. 19 through 23 show another complex embodiment of the hat device in which the slopes are indicated by suitable arrows. In this instance the brackets numbered 160 through 165 slope correspondingly with the roof and receive the ridge, hip or valley girders as indicated by the roof configuration identified at 121 in FIG. 15. For example, a hip girder (similar to a ridge girder, FIG. 14) would be received at 166, a valley girder at 167, and a ridge girder at 168. Openings at 170, 171 and 172 accommodate the webs of other frame members, such as a rafter at 170 or struts at 171 and 172.

It will now be seen that devices and assemblies constructed in accordance with the principles of the examples described above are effective for connection and support of lateral frame members for pitched roofs, such as rafters, valley girders, hip girders or other members which slope at angles conforming with various aspects of the roof incline, and also members such as ridge girders which may have a horizontal position. As indicated, a sloping character of the brackets may be required or desirable not only for frame members which are disposed in inclined relation, but also for ridge or other horizontal members that may have sloping components, such as the sloping upper flange parts of the girder of FIG. 14. A wide variety of specific situations in pitched roofs can be accommodated, by selection of correspondingly appropriate slopes for the several brackets or bracket parts, not only to suit all of the designated localities in FIG. 15 but also for a variety of other conditions, as will now be readily apparent from the several exemplary embodiments shown. In other words, joints for the places of such other roof form combinations can be easily attained with only variations in detail or in the requisite combination of planes and brackets, as compared with the specific devices described hereinabove.

Although the related rafters, girders or other members can be seated or carried on the connecting device otherwise than by disposition of their upper flanges on the sloping surfaces of the brackets (e.g. in that lower flanges can be so seated) and although the central section 41 of the device need not, in all cases, be itself characterized by a slope or combination of slopes in conformity with the selected roof condition, or indeed need not be entirely closed, the illustrated arrangements of the units (in these respects) are presently preferred and deemed of special advantage. References herein to the support of rafters or other beams or the like by their upper flanges are intended to include support by conventional bearing plates situated near the upper flanges of such members, the term flanges being thus employed as inclusive of such bearing plates, unless otherwise specified.

Roof frames assembled with connecting devices pursuant to the invention are readily adapted for enclosure, as by panels, sheets or other elements or assemblies supported on or across the several rafters, girders, struts or the like, so as to form complete, effectively secured and weather-tight roofs. As in the manner shown, the disclosed frame assemblies for pitched roofs are effectively carried on a building frame structure below, the latter structure being usually composed of rectangularly interconnected vertical and horizontal members. Although the lateral roof frame members have in these embodiments been shown as supported by their upper flanges bearing on brackets of the hat device, it is contemplated that other supporting means, such as support of the webs of the members by tight, bolted, lapped attachment to corresponding outstanding vertical webs or legs extending out from the body of the hat might be used.

It is to be understood that the invention is not confined to the specific examples or embodiments herein shown and described, but may be carried out in other ways and details without departure from the principles of the invention.

I claim:
1. In building structure, at least two connecting devices in spaced position along a ridge or valley of a pitched roof, each of said devices being provided for connection between one or more lateral frame members of such roof and a hollow columnar structure, below the connecting device, that has a substantially square enveloping contour and upward facing edge surface means, each connecting device comprising a vertically extending body portion to be seated on such columnar structure, said body portion including downwardly extending sleeve means adapted to interfit with the columnar structure for retention thereby and downward facing horizontal edge surface means for engagement with said upward facing edge surface means of the columnar structure to transmit load in bearing, and supporting-surface means, having a configuration to conform with a part of said roof, at the top of said body portion, including at least one bracket projecting laterally from the body portion in a direction toward the other of the aforesaid two connecting devices, said bracket having upwardly facing, beam-supporting surface structure sloping in conformity with the sloping shape of the roof, said surface structure comprising a pair of supporting surfaces sloping in opposed directions relative to an apex line that extends outward from the body portion, said last-mentioned surfaces each defining an acute angle with a vertical plane through said apex line, for conformity with a roof region where two roof surfaces meet at corresponding angles; in combination with at least one beam, extending between said devices, that has upper flange structure comprising flange parts meeting at the same corresponding angles along a line lengthwise of the beam, said upper flange structure at each end of the beam being supported by the aforesaid bracket of one of the connecting devices, with said flange parts of the beam respectively seated on said pair of bracket surfaces, and said beam forming the ridge or valley frame member of said roof region.

References Cited

UNITED STATES PATENTS

| 797,474 | 8/1905 | Walker | 52—93 X |
| 3,097,730 | 7/1963 | Halle | 287—189.36 |

FOREIGN PATENTS

| 62,333 | 1/1955 | France. |
| 1,191,091 | 4/1959 | France. |

CARL W. TOMLIN, *Primary Examiner.*

RICHARD W. COOKE, JR., *Examiner.*

W. L. SHEDD, *Assistant Examiner.*